Nov. 18, 1952   C. H. MAYER   2,618,186
TORQUE-LIMITING ROTARY POWER TRANSMISSION DEVICE
Filed Nov. 15, 1950

INVENTOR.
CHARLES H. MAYER
BY Kenyon & Kenyon
ATTORNEYS

Patented Nov. 18, 1952

2,618,186

UNITED STATES PATENT OFFICE 2,618,186

TORQUE-LIMITING ROTARY POWER TRANSMISSION DEVICE

Charles H. Mayer, Stratford, Conn., assignor to Bridgeport Brass Company, Bridgeport, Conn., a corporation of Connecticut Application November 15, 1950, Serial No. 195,774

1 Claim. (Cl. 81—52.4)

This invention relates to a torque-limiting rotary power transmission device.

One of the objects is to provide a device through which rotary power may be transmitted to screw into position small screw parts and which will slip or stall when the screw part offers a predetermined torque reaction, while permitting the source of rotary power to operate continuously. Another object is to provide a device performing as described and which may be set to slip or stall at a predetermined torque reaction and which will continue to slip or stall at the set value throughout a relatively long period of time without unduly wearing or overheating and while operating under the conditions prevailing in manufacturing plants. Still another object is to provide a small and compact unitary device which may be installed between a motor and a wrench or other driven part and which will transmit the rotary motion only up to a predetermined torque reaction by the wrench or part while permitting the motor to continuously operate. Other objects may be inferred from the nature of the invention.

The principles and operation of the invention and one mode of embodying the invention are illustrated hereinbelow with the aid of the accompanying drawings. In this instance the invention is embodied in a form suitable for use in connection with the installation of valve cores in pneumatic tire, inner tube, valve stems. However, the invention may be embodied in other forms of devices used for other purposes.

Figure 1:
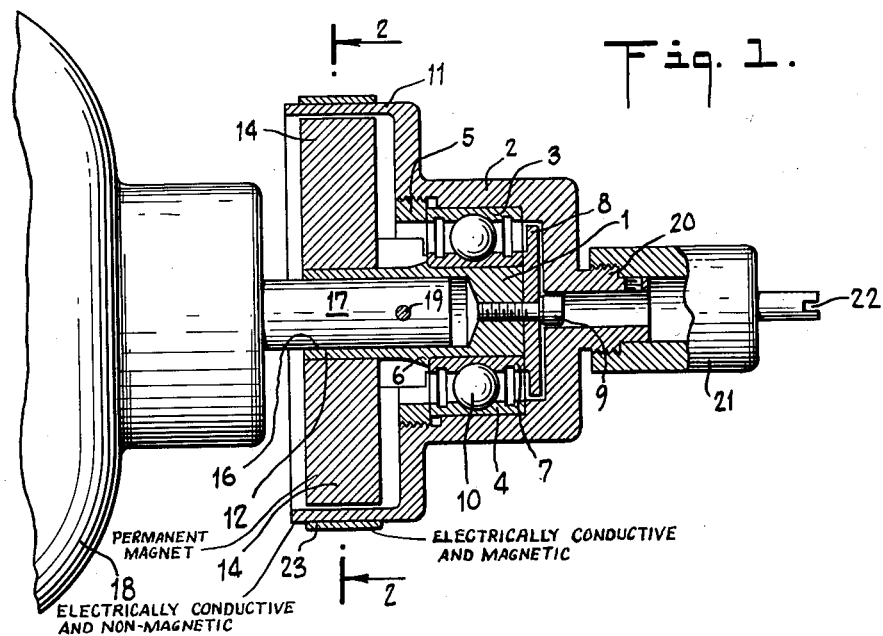
Figure 2:
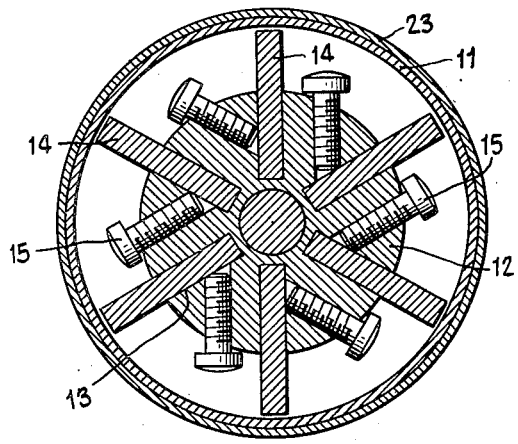

The accompanying drawings illustrate the mentioned form of the invention, Fig. 1 being a longitudinal section and Fig. 2 being a cross section taken on the line 2—2 in Fig. 1.

As shown by these drawings, the illustrated device incorporates axially concentric, superimposed inner and outer hubs 1 and 2 respectively. These hubs are journaled together by an anti-friction bearing capable of sustaining axial thrust, the hub 2 having a bore 3 receiving the outer race 4 of this bearing and this race being anchored in the bore 3 by a ring nut 5. The inner hub 1 has a collar 6 against which the inner race 7 of the anti-friction bearing is held by an end plate 8 positioned by a screw 9 which is screwed into the end of the inner hub 1. The anti-friction bearing is shown as having balls 10 as its rolling elements. Since it is of a thrust-resistant type the bearing positions the inner and outer hubs against axial separation.

Both hubs project axially from the anti-friction bearing, the outer hub 2 being enlarged and providing a generally cylindrical cup 11 surrounding the corresponding projecting portion 12 of the inner hub 1. The two hubs are made of aluminum so the cup is made of non-magnetic metal. Other non-magnetic metals might be substituted. As shown more clearly by Fig. 2, this portion 12, made of non-magnetic material, is provided with a plurality of radial slots 13 into which permanent magnets in the form of flat bars 14 are radially slid in planes extending axially respecting the hubs. Screws 15 serve to anchor the various flat bar magnets 14 in their slots 13 provided by the hub portion 12. The outer ends of the magnets are very close to the inside of the cup but they do not touch it. Thus the fields of these magnets are cut by the cup side wall.

The projecting portion 12 of the inner hub 1 is provided with a concentric bore 16 which receives the shaft 17 of an electric motor 18. The shaft 17 is non-rotatively fastened to the inside of the bore 16 in the projecting portion 12 of the inner hub. The parts may be press fitted together and a pin 19 may be driven transversely through the shaft 17 and the hub 12 to effect the interfastening. The outer end of the outer hub 2 is concentrically provided with a threaded stud 20 on which a wrench 21 is screwed. In view of the intended purpose of the illustrated device this wrench is provided with a slotted tip 22 which is adapted to engage a valve core and screw it into a valve stem.

In operation the valve core is slipped into the valve stem and the latter is fitted against the wrench tip 22, the motor 18 operating continuously. The bar magnets 14 drive the cup 11 so as to rotate the wrench 22 substantially at the speed of the motor shaft 17. As soon as the valve insides provide the torque reaction which the device is designed not to exceed, the magnetic drag becomes insufficient and the wrench tip 22 stops rotating along with, of course, the entire hub outer assembly. As soon as the wrench tip 22 is removed from the valve stem with its assembled core the outer hub assembly and the wrench should almost immediately again begin to rotate at the speed of the motor shaft 17. If this does not happen production is interfered with. In some instances the aluminum outer hub may not regain its full speed rapidly enough in spite of its naturally light weight.

Almost immediate resumption of full speed after stalling is provided the cup 2 by press fitting a magnetic metal ring 23 onto the outside of the cup 11 opposite to the rotating bar magnets 14. This ring 23 is shown in the form of a flat, relatively thin, cylindrical band having a width substantially equalling that of the flat bar magnets 14 which are all made of the same dimensions. The use of this flat magnetic ring 23, which may be made of iron or steel, causes the aluminum outer cup to almost retain its full rotary speed without interfering with the stalling action. As shown, this ring is on the side of the annulus, formed by the cup wall, which is opposite to the side adjacent to the magnets.

It is to be noted that the illustrated device is in the form of a compact unit having its only mechanically operating part, the anti-friction bearing, well protected from dirt. There are no friction clutches or the like which must slip so as to cause excess heating and wearing which inevitably interferes with the accuracy of their torque responsiveness. There is practically nothing to wear out and the user of the new device cannot tamper with it so as to change the torque value at which the outer cup assembly ceases to turn with the inner hub.

If desired the ring 23 may be made narrower than the magnets. Furthermore, the ring may be circular in cross section.

I claim:

A device for screwing valve cores into pneumatic tire valve stems with a uniform tightness, said device comprising a motor having a rotary drive shaft extension projecting away from the outside of said motor, an inner hub encircling said extension and mounted thereon so as to rotate therewith, said inner hub having a journal portion adjacent to the outer end of said extension and having a magnet assembly mounting portion spaced therefrom towards said motor, a permanent magnet assembly mounted on said mounting portion and projecting radially therefrom, an outer hub having a journal portion rotatively journaled on said inner hub's journal portion and having an electrically conductive cup portion projecting from said outer hub's journal portion towards said motor and encircling said magnet assembly, said outer hub's portions being constructed and arranged to structurally enclose said inner hub and magnet assembly radially, and a tire core tool mounting means mounted on the end of said outer hub's journal portion away from said motor, said means being constructed and arranged to mount a valve core engaging tool pointing axially away from said extension and free for use for screwing in the valve cores.

CHARLES H. MAYER.

REFERENCES CITED

The following references are of record in the file of this patent:

UNITED STATES PATENTS

| Number | Name | Date |
|---|---|---|
| 643,413 | Kennedy | Feb. 13, 1900 |
| 653,424 | Lunt | July 10, 1900 |
| 1,310,626 | Lewis | July 22, 1919 |
| 2,232,789 | Kollsman | Feb. 25, 1941 |
| 2,497,402 | Findley | Feb. 14, 1950 |
| 2,521,574 | Findley | Sept. 5, 1950 |
| 2,541,831 | Prince | Feb. 13, 1951 |
| 2,553,256 | Hollenbeck | May 15, 1951 |
| 2,566,743 | Okulitch et al. | Sept. 4, 1951 |